US 6,622,986 B2

(12) United States Patent
Gagnon

(10) Patent No.: US 6,622,986 B2
(45) Date of Patent: Sep. 23, 2003

(54) REGULATOR VALVE WITH SPACING CHAMBER

(75) Inventor: Frederic Gagnon, Chatham (CA)

(73) Assignee: Siemens Canada Limited, Ontario (CA)

(*) Notice: Subject to any disclaimer, the term of this patent is extended or adjusted under 35 U.S.C. 154(b) by 29 days.

(21) Appl. No.: 09/888,576

(22) Filed: Jun. 26, 2001

(65) Prior Publication Data

US 2002/0017626 A1 Feb. 14, 2002

Related U.S. Application Data

(60) Provisional application No. 60/244,227, filed on Oct. 30, 2000, provisional application No. 60/214,629, filed on Jun. 28, 2000, and provisional application No. 60/214,667, filed on Jun. 27, 2001.

(51) Int. Cl.[7] .............................................. F16K 31/02
(52) U.S. Cl. .................................. 251/129.11; 251/308
(58) Field of Search ....................... 251/568.23, 568.24, 251/303, 308, 129.11, 129.12, 129.13, 129.04

(56) References Cited

U.S. PATENT DOCUMENTS

| 4,290,615 A | * | 9/1981 | Etcheverry ................... 251/307 |
| 4,662,604 A | * | 5/1987 | Cook ..................... 251/129.07 |
| 4,888,509 A | * | 12/1989 | Tomasek ..................... 310/42 |
| 5,531,205 A | * | 7/1996 | Cook et al. ............. 123/568.24 |
| 5,540,560 A | * | 7/1996 | Kimura et al. .............. 417/223 |
| 5,740,785 A | | 4/1998 | Dickey et al. ............... 123/568 |
| 5,865,156 A | | 2/1999 | Feucht et al. ................ 123/446 |
| 6,012,437 A | * | 1/2000 | Radhamohan et al. . 123/568.23 |
| 6,062,205 A | | 5/2000 | Bevan et al. ........... 123/568.24 |
| 6,089,019 A | | 7/2000 | Roby et al. ................ 60/605.2 |
| 6,135,415 A | | 10/2000 | Kloda et al. ............ 251/129.11 |
| 6,164,269 A | | 12/2000 | Feucht et al. .......... 123/568.11 |
| 6,178,956 B1 | * | 1/2001 | Steinmann et al. .... 123/568.21 |

* cited by examiner

Primary Examiner—Edward K. Look
Assistant Examiner—John K Fristoe, Jr.

(57) ABSTRACT

An apparatus and method for reducing heat transfer between a motive force device and a valve. The apparatus consists of a regulator valve. The valve comprises a wall defining a flow passage disposed along a longitudinal axis. A closure member is disposed in the flow passage for rotation about an axis oblique to the longitudinal axis. The closure member is movable to a first position to prevent flow in the flow passage and the closure member is also movable to a second position to permit flow in the flow passage. A motive force device is disposed along the axis and coupled to the closure member by an insulator member. The motive force device is disposed such that it can rotate the closure member between the first position and the second position about the axis. The valve also comprises a spacing chamber having an inner wall and an outer wall. The inner wall forms a volume that houses the insulator member, the outer wall of the spacing chamber is coupled to the motive force device and the flow passage. The method comprises coupling a chamber having a defined volume to the motive force device and the regulator valve; and connecting the driveshaft of the motive force device to the actuating shaft of the valve with an insulator member.

17 Claims, 4 Drawing Sheets

REGULATOR VALVE WITH SPACING CHAMBER

RELATED APPLICATIONS

The present application is related to and claims priority from Provisional Patent Application entitled "Back Pressure Regulator (Non Linear EGR)", Ser. No. 60/214,629, filed Jun. 28, 2000, Provisional Patent Application entitled "Use of a Single Magnet for Dual Purpose in a Rotary Actuator," Ser. No. 60/244,227 filed Oct. 30, 2000, and Provisional Patent Application entitled "Apparatus for Fuel Cells," Ser. No. 60/214,667 filed Jun. 27, 2001, which are incorporated in their entirety by reference into the present application herewith.

BACKGROUND OF THE INVENTION

It is believed that an Exhaust Gas Regulator ("EGR") consists of, among other components, a valve which is inserted into an exhaust gas flow passage. The valve is can be used to control the flow rate of exhaust gas through the passage.

An EGR is also believed to include an actuator shaft that is connected to and manipulates the valve, with a motor that drives the actuator shaft. It is believed that the position of the valve within the exhaust gas flow passage subjects the valve to very high temperatures. It is further believed that the actuator shaft conducts heat energy from the valve to the motor, thereby increasing the operational temperature of the motor. It is yet further believed this temperature increase can adversely effect the performance of the motor and possibly damage the motor.

SUMMARY OF THE INVENTION

The invention provides for a regulator valve, preferably an exhaust back pressure regulator valve, alternatively an exhaust gas recirculation valve. The regulator valve has a wall defining a flow passage disposed along a longitudinal axis. A closure member is disposed in the flow passage for rotation about an axis oblique to the longitudinal axis. The closure member is movable to a first position to prevent flow in the flow passage and the closure member is also movable to a second position to permit flow in the flow passage. A motive force device is disposed along the axis and coupled to the closure member by an insulator member. The motive force device is disposed such that it can rotate the closure member between the first position and the second position about the axis. The valve also includes a spacing chamber having an inner wall and an outer wall. The inner wall forms a volume that houses the insulator member, the outer wall of the spacing chamber is coupled to the motive force device and the flow passage.

The present invention provides a method of reducing heat transfer between a hot air passage and a motive force device of a valve disposed at an axis oblique to a longitudinal axis of the flow passage. Preferably, the valve is connected to a driveshaft extending through a wall surface of the flow passage, and the motive force device has an actuating shaft disposed along the longitudinal axis of the flow passage. The method of reducing heat transfer between the flow passage and the motive force device can be achieved by thermally insulating the flow passage from the motive force device. Preferably, the method can be achieved by coupling a chamber having a defined volume to the motive force device and the valve; and connecting the driveshaft to the actuating shaft with an insulator member.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
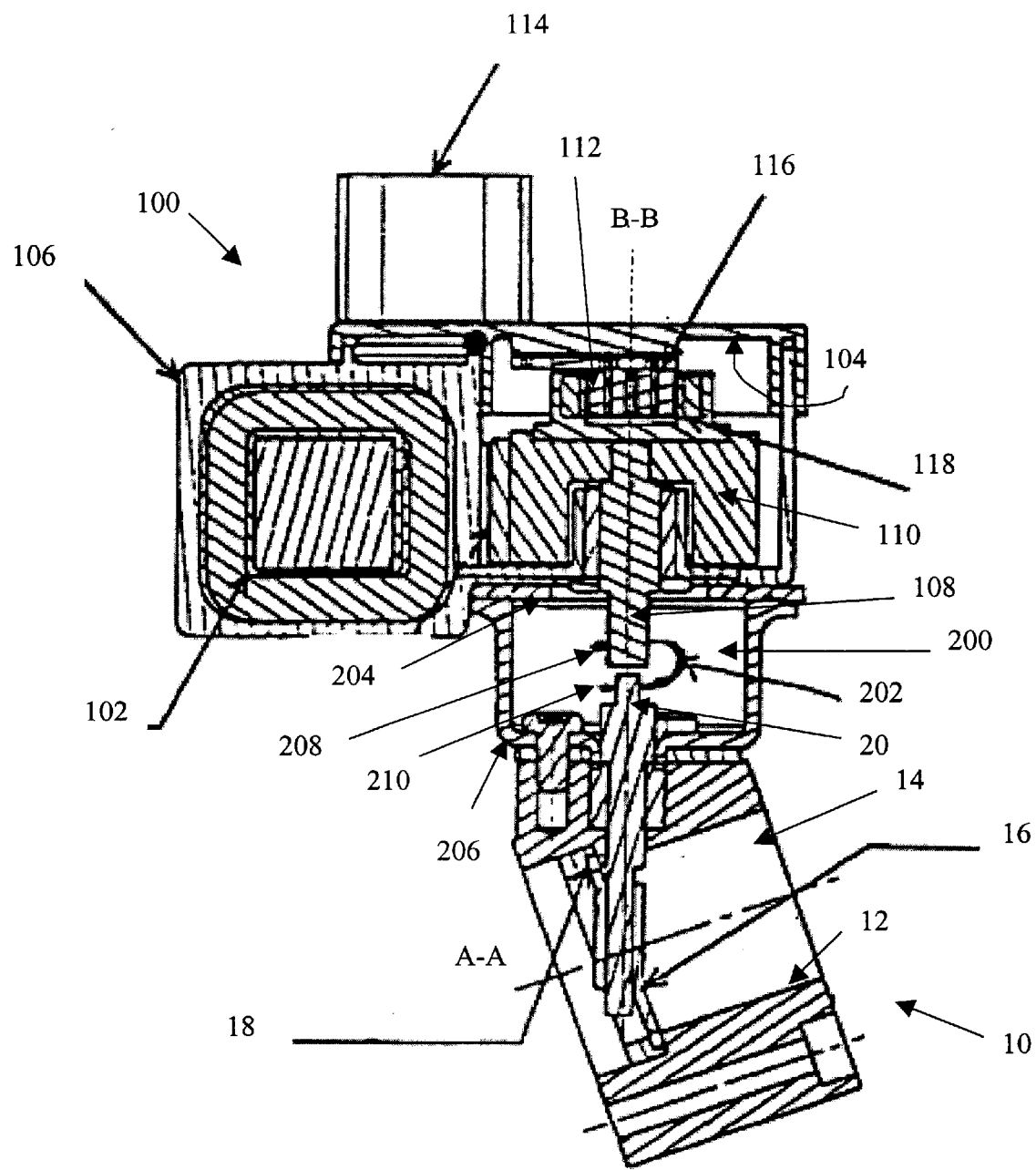
FIG. 1 is a schematic illustration of a preferred embodiment of the regulator valve.
Figure 2A:
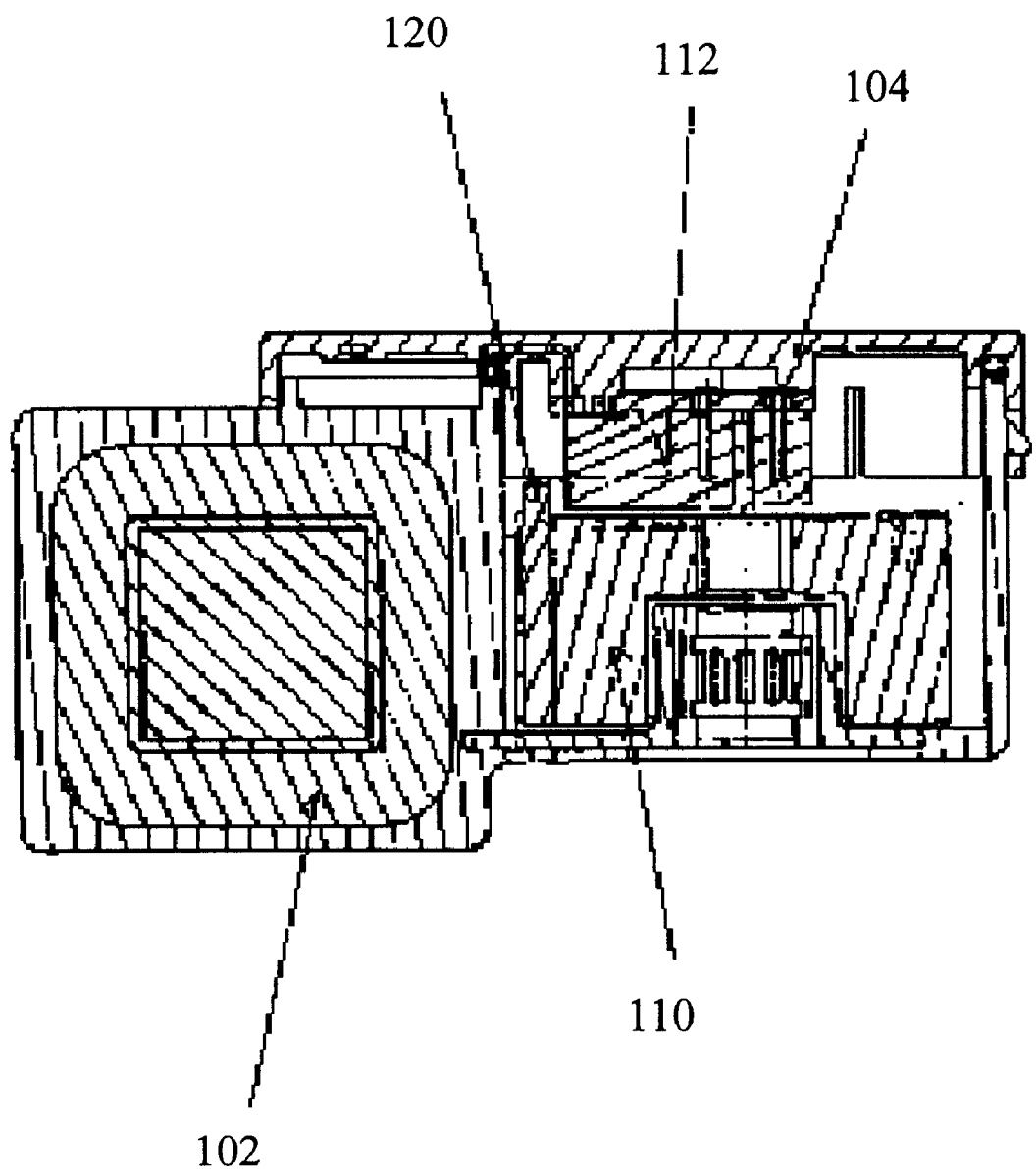
FIGS. 2A, 2B and 2C are cross sectional views of two variations of the motive force device of the preferred embodiment of FIG. 1.
Figure 2B:
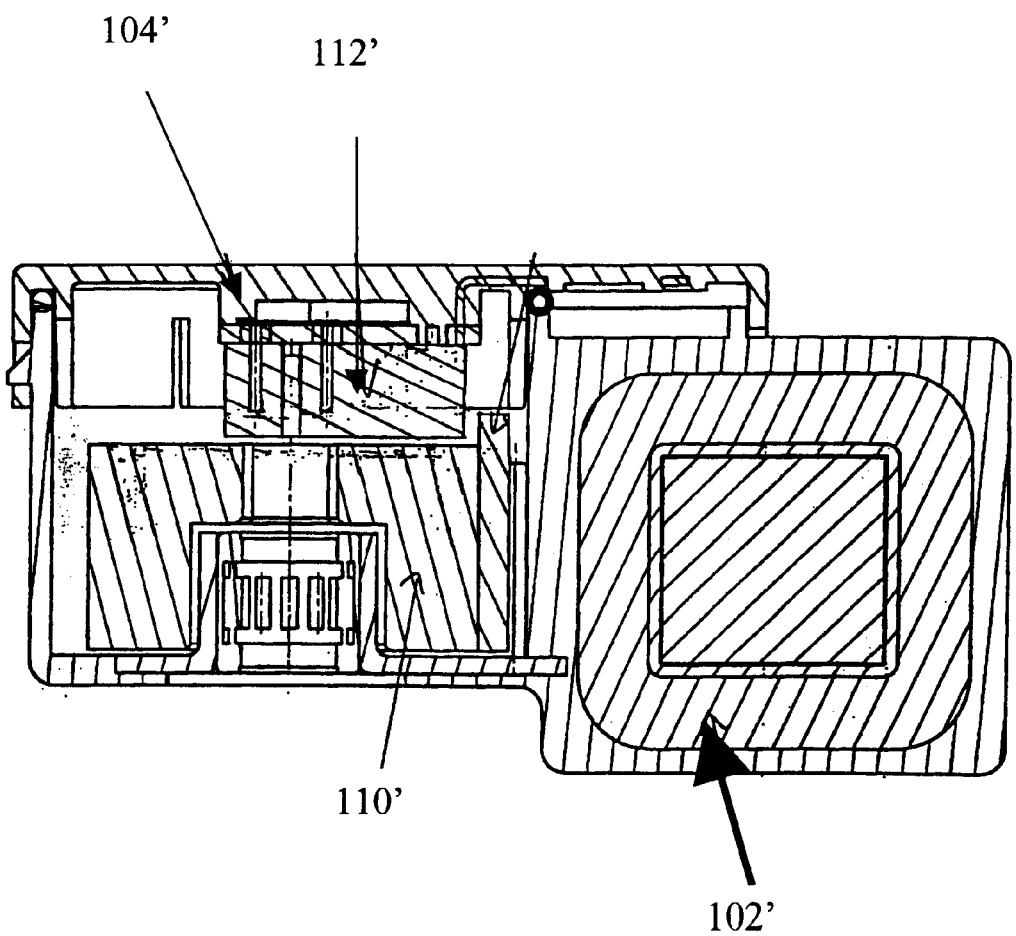

FIG. 1 shows a regulator valve according to a preferred embodiment that can be used with one or more of the electric motors shown in FIGS. 2A and 2B. In particular, as shown in FIG. 1, the regulator valve 10 includes a wall 12 defining a flow passage 14 disposed along a longitudinal axis A—A. A closure member 16 is disposed in the flow passage 14 for rotation about an axis B—B oblique to the longitudinal axis A—A. The closure member 16 is movable to a first position to prevent flow in the flow passage 14 and the closure member 16 is also movable to a second position to permit flow in the flow passage 14. Preferably, the closure member 16 is a butterfly valve.

A motive force device 100 is disposed along the axis B—B and coupled to the closure member 16 by an insulator member 202. The motive force device 100 is disposed such that it can rotate the closure member 16 between the first position and the second position about the axis B—B. The valve also includes a spacing chamber 200 having an inner wall 204 and an outer wall 206. The inner wall 204 forms a volume that houses the insulator member 202, the outer wall 206 of the spacing chamber 200 is coupled to the motive force device 100 and the flow passage 14. The flow passage 14 can include a boss portion with a seal 18 contiguous to the closure member 16 in the first position. The volume of the spacing chamber can be configured such that, depending on the operating temperature of the exhaust gas, the heat transferred from the flow passage 14 to the motive force device can be within a selected range of Btu over the product of area and unit time ($Btu/(ft^2 * hour)$ or $Kw/m^2$).

The motive force device 100 can be an electric torque motor. The electric motor can include a housing 102 having an interior surface 104 and an exterior surface 106, where the interior surface 104 encloses a driveshaft 108 coupled to a rotor 110 rotatable around the axis B—B and surrounded by a stator 112. The butterfly valve can be coupled to a rod 20 disposed along the axis B—B. The insulator member 202 can be an elastic metal member having a first end 208 and a second end 210, the first end 208 contiguous to the driveshaft 108 and the second end 210 contiguous to the rod 20 of the butterfly valve. The insulator member can be configured in a variety of shapes such as, for example, an open ended u-shaped elastic spring shown in FIG. 1 or the u-shaped elastic spring having an extension that connects the two ends of the unshaped elastic spring to form a box-shaped member with two open ends.

The housing 102 can include an electrical connector 114 disposed on the exterior surface 106 of the housing 102, and electrically connected to the electric torque motor. The motive force device 100 can include a sensor disposed in the interior surface 104 of the housing 102 proximate the rotor 110. The sensor can include a stator sensor 116 fixed to the housing 102 and a rotor sensor 118 coupled to the rotor 110.

Figure 2C:
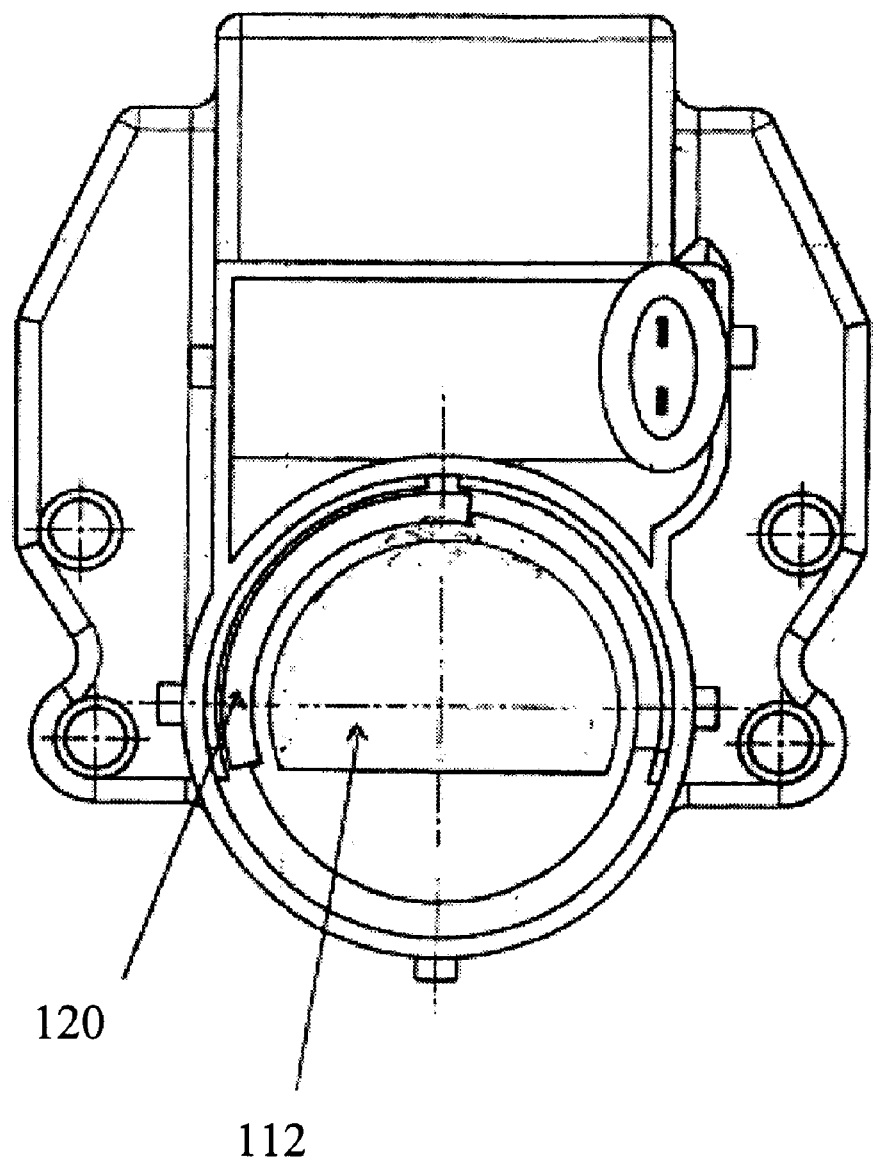

The stator 112 of the electric motor can be disposed in the interior surface 104 of the housing 102 at an offset position relative to the axis B—B. The electric motor can also have a sensor disposed in the housing 102, the sensor including a rotor sensor 110 coupled to the driveshaft 108 and a stator sensor 116 disposed proximate the rotor sensor 110. The rotor 110 can be a generally cylindrical magnetic rotor. In another variation of the electric motor, as illustrated in FIGS. 2A and 2C, the generally cylindrical magnetic rotor can have a magnet portion 120 extending from the generally cylindrical magnetic rotor along the axis B—B such that the magnet portion 120 projects beyond a planar surface defined by a base of the generally cylindrical magnetic rotor 110. The stator 112 can include a stator sensor 116, such as a Hall effect sensor, coupled to the housing 102, such that the magnetic portion 120 rotates about the stator sensor 116. Preferably, the electric motor can be configured as a mirror image of the electric motor of FIG. 2A, as shown in FIG. 2B. Since the electric motor of FIG. 2B is a mirror image of FIG. 2A, like elements are denoted with a prime indicator, and all functionality of FIG. 2A is maintained.

In operation, hot exhaust gas flows along the axis A—A in the flow passage 14 with the butterfly valve in a first (substantially open) position that permits substantially unimpeded exhaust flow. Upon a delivery of electrical signals to the motive force device 100 by a controller (not shown), the drive shaft 108 is rotated about axis B—B, thereby causing the insulator member 202 to also rotate the closure member 16 towards a second (substantially closed) position. Because the insulator member 202 is elastic in nature, the insulator 202 can absorb any lost motion between the drive shaft 108 and the closure member 20. As the closure member 16 is rotated towards a closed position, the exhaust flow is impeded, thereby, it is believed, causing a change in the exhaust back pressure in the flow passage 14 as a function of the angular position of the closure member 16. In order to determine a desired amount of exhaust back pressure, it is believed that the angular position of the closure member 16 can be determined by a sensor 116 mounted on the housing that senses a change in the magnetic flux as the magnetic portion 120 (FIGS. 2A and 2B) rotates about axis B—B.

Although the regulator valve has been described as operating in conjunction with a fuel cell, it should be noted that the regulator valve described herein could also be used in other internal combustion application where a variable backpressure is desired in an exhaust flow. Additionally, the regulator valve described herein can also be used as an EGR (Exhaust Gas Recirculation) valve in, for example, an emission control system of an internal combustion application.

Thus, according to the preferred embodiments, it is believed that the heat transfer between a motive force device 100 and the regulator valve 10 is decreased by coupling a chamber 200 having a defined volume to the motive force device 100, and connecting the driveshaft 108 of the motive force device 100 to the actuating shaft 18 of the valve 10 with an insulator member 202.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A regulator valve, the valve comprising:
   a wall defining a flow passage disposed along a longitudinal axis;
   a closure member disposed in the flow passage for rotation about an axis oblique to the longitudinal axis, the closure member movable to a first position to prevent flow in the flow passage and movable to a second position to permit flow in the flow passage;
   a motive force device disposed along the axis, the device coupled to the closure member by an insulator member, the device disposed for rotation between the first position and the second position about the axis; and
   a spacing chamber having an inner wall and an outer wall, the inner wall forming a volume that houses the insulator member, said inner wall extending substantially continuously around the insulator member, the outer wall of the spacing chamber being coupled to the motive force device and the flow passage.

2. The regulator valve of claim 1, wherein the motive force device comprises an electric torque motor, the electric motor including a housing having an interior surface and an exterior surface, the interior surface enclosing a driveshaft coupled to a rotor rotatable around the axis and surrounded by a stator.

3. The regulator valve of claim 2, wherein the closure member comprises a butterfly valve, the butterfly valve coupled to a rod disposed along the axis.

4. The regulator valve of claim 3, wherein the insulator further comprises an elastic metal member having a first end and a second end, one of the first end and a second end contiguous to the driveshaft, the other of the first end and second end contiguous to the rod of the butterfly valve.

5. The regulator valve of claim 2, wherein the electric motor further comprises a stator disposed in the interior surface of the housing, the stator located at an offset position relative to the axis.

6. The regulator valve of claim 2, wherein the electric motor further comprises a sensor disposed in the housing, the sensor including a rotor sensor coupled to the driveshaft and a stator sensor disposed proximate the rotor sensor.

7. The regulator valve of claim 2, wherein the rotor further comprises a generally cylindrical magnetic rotor, the generally cylindrical magnetic rotor having a magnet portion extending from the generally cylindrical magnetic rotor along the axis such that the magnet portion projects beyond a planar surface defined by a base of the generally cylindrical magnetic rotor.

8. The regulator valve of claim 7, wherein the stator further comprises a stator sensor coupled to the housing, the magnetic portion disposed to rotate about the stator sensor.

9. The regulator valve of claim 7, wherein the stator sensor further comprises a Hall effect sensor.

10. The regulator valve of claim 1, wherein the flow passage further comprises a boss portion disposed in the flow passage, the boss portion having a seal contiguous to the closure member in the first position.

11. The regulator valve of claim 2, wherein the motive force device further comprises a sensor disposed in the interior surface of the housing proximate the rotor.

12. The regulator valve of claim 11, wherein the sensor further comprises a stator sensor fixed to the housing and a rotor sensor coupled to the rotor.

13. The regulator valve of claim 2, wherein the housing further comprises an electrical connector disposed on the exterior surface of the housing, the electrical connector being electrically connected to the electric torque motor.

14. The regulator valve of claim 1, wherein the valve is an exhaust back pressure valve.

15. The regulator valve of claim 1, wherein the valve is an exhaust gas recirculation valve.

16. The regulator valve according to claim 1, wherein the spacing chamber is configured such that heat transferred from the flow passage to the device is within a selected range.

17. A method of reducing heat transfer between an motive force device and a regulator valve disposed at an axis oblique to a longitudinal axis of a flow passage, the valve connected to a driveshaft extending through a wall surface of the flow passage, the motive force device having an actuating shaft disposed along the axis, the method comprising:

connecting in a chamber said drive shaft to said actuating shaft with an insulator member; and coupling said chamber having an inner wall and a defined volume to said motive force device and said valve, the coupling including said inner wall extending substantially continuously around said insulator member.

* * * * *